March 31, 1936.     F. W. LUTZ     2,036,061
INTERCHANGEABLE UNIT CAMERA
Filed July 18, 1935     2 Sheets-Sheet 1
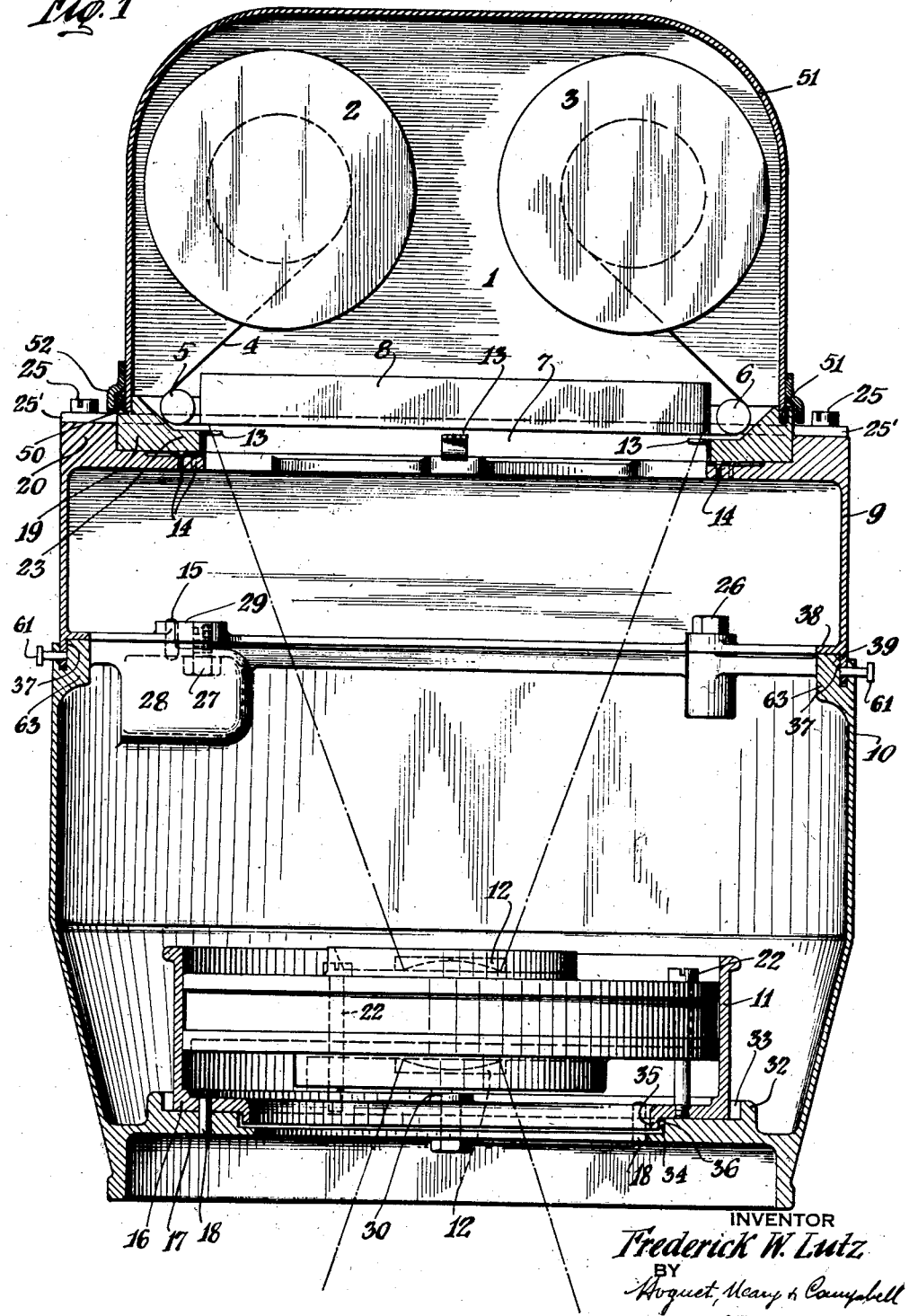
INVENTOR
Frederick W. Lutz
BY
ATTORNEYS

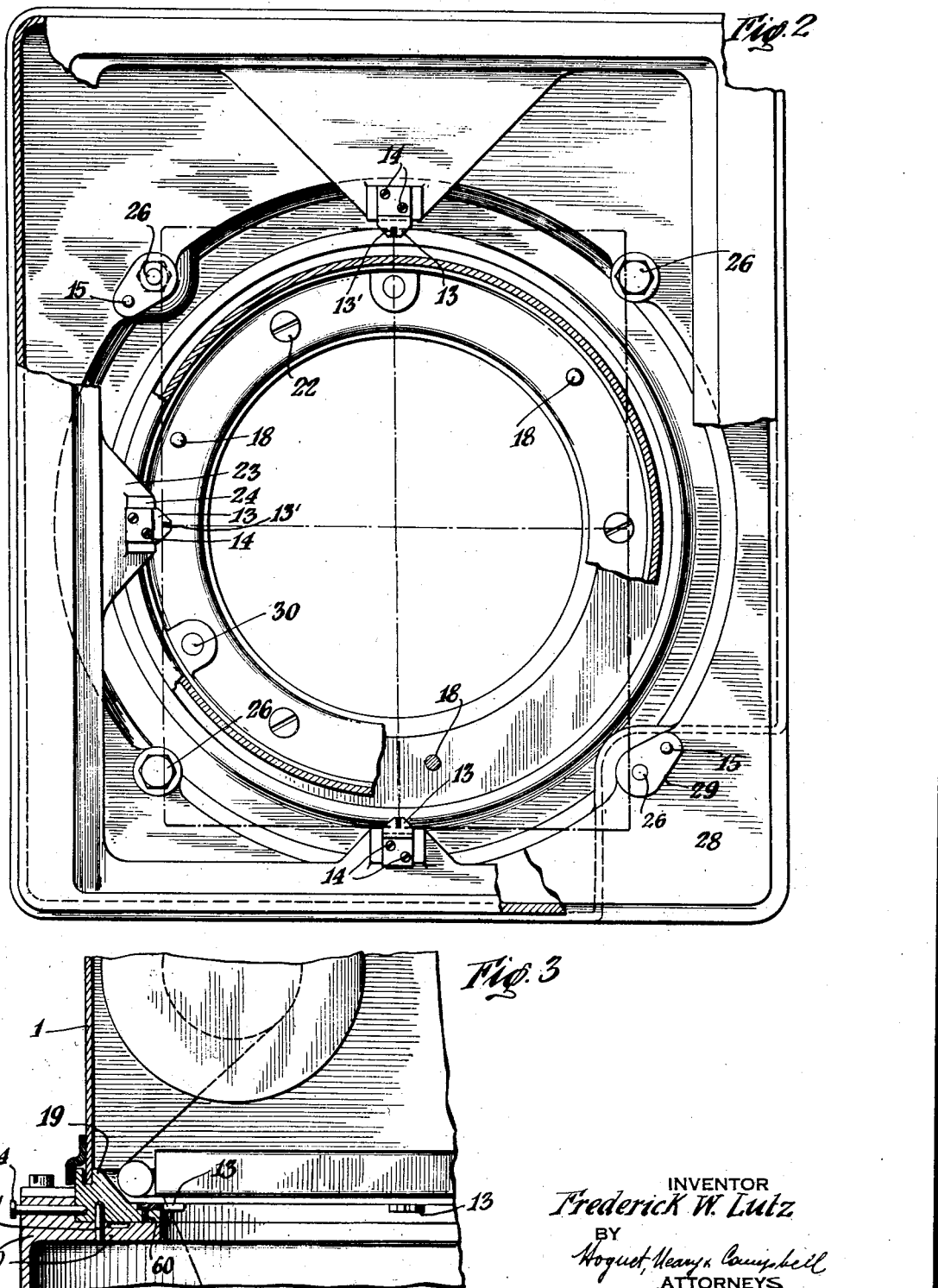

Patented Mar. 31, 1936

2,036,061

UNITED STATES PATENT OFFICE 2,036,061

INTERCHANGEABLE UNIT CAMERA

Frederick W. Lutz, Garden City, N. Y., assignor to Fairchild Aerial Camera Corporation, Woodside, N. Y., a corporation of New York Application July 18, 1935, Serial No. 31,962

13 Claims. (Cl. 95—34)

This invention relates in general to cameras and more particularly to cameras with interchangeable parts.

In aerial photographic operations and especially in mapping projects where the negatives or contact prints are used in plotting machines, it is important that the exact location of the optical axis of the camera lens be recorded on the negative or that the negative shall contain some reference points whereby this optical axis may be located with respect to the negative. This may be accomplished in one or more ways such as the photographing on the film at the time of exposure, a mark by which the exact location of the optical axis of the lens on the resulting negatives is indicated. Another method of obtaining the desired result is to photograph on the film at the time of exposure reference points by which the exact location of the optical axis of the lens on the resulting negative may be accurately located by properly joining the reference points by a series of lines, the intersection of which will denote the optical axis. The mark and the reference points may be photographed on the film either directly or by means of reflecting mirrors or prisms.

In order to accurately locate these marks or reference points on the negative it is necessary to have all of the parts of the camera, the fiducial mark or plates to be photographed and also the lens, all in proper relationship. The film is so positioned in the focal plane that upon exposure the fiducial marks will be accurately recorded resulting in the accurate location of the optical axis of the camera lens on the negatives. Therefore it is essential that this relationship be predetermined and fixed for each camera and this relationship must be maintained or the optical axis cannot be accurately located on the negative.

In photographic operations it is often desirable to use lenses of various focal lengths and this in turn requires the use of lens cones of corresponding lengths. Therefore, in order to obtain the desired results, this has previously necessitated the use of a different camera each time a lens of different focal length was used. This would require a large number of very expensive pieces of equipment and for operation in the field would add tremendously to the equipment necessary to be transported and kept on hand. If the lens cones were changed it would be necessary to collimate the lens each time and this would require extra equipment and would otherwise be an unsatisfactory operation. Furthermore, the collimation of a lens is a highly delicate and precise operation and requires great accuracy which cannot be readily obtained in the field.

It is therefore an object of this invention to provide for ready interchangeability of parts of a camera and still maintain the high degree of accuracy required in aerial photographic mapping.

More specifically it is an object of this invention to provide means whereby cameras may be used with cones for lenses of different focal lengths and still maintain their proper relationship so that the optical axis of the lens may always be accurately located on the negative or print for any and all cones that may be used.

Another object of the invention is to provide an improved means of producing on the film, during the exposure, fiducial marks or reference points for accurately locating on the print or negative the optical axis of any one of a series of lenses.

The camera may take the form of the conventional aerial camera comprising the usual main parts, such as the magazine, case and cone, the lens being carried in the cone. The fiducial plates may be carried either by the camera case or by the magazine or the fiducial marks may be carried by a glass plate carried by the case, this construction depending on the means for holding the film flat during exposure operation. The film may be held flat by such usual means as a pressure plate or a vacuum device for forcing the film to lie flat in the focal plane.

In the event that the fiducial plates are carried by the camera case the fiducial plates according to my invention are preferably doweled to the case and the case in turn to the cone so that the center of the area bounded by the plates will bear a constant relationship to the dowel pins joining the case and the cone. The drilling of the holes for the dowels should be accurately done while the camera is held firmly in a jig against any possible relative movement. Then by the use of a collimator the optical axis of the lens may be made to coincide with the exact center of the area bounded by the fiducial plates. This may be done by placing a glass plate upon which are lined cross hairs and these lines are positioned with respect to the plates so as to make it possible to determine the exact center of the area bounded by the plates. By placing a light above a point at which the lines cross and by placing a container of mercury below the lens the point of crossing is thus projected through the lens to the mercury and is then reflected back. The lens is then shifted laterally until the reflected image coincides with the actual point of crossing of the lines. When this coincidence occurs the optical axis of the lens is accurately located with respect to the area bounded by the fiducial plates. The lens is then fixed in this adjusted position. Therefore, by reason of this relationship and since all lens in all cones are collimated in a similar manner, the parts may be interchanged at will and the optical axis will still maintain its relationship with the center of the area bounded by the fiducial plates.

The foregoing was merely one application of my invention, the exact nature of which will become more apparent on a further reading of the following specification and appended claims, certain embodiments of the invention being illustrated in the accompanying drawings in which:

Figure 1 is a view in vertical section taken through an aerial camera showing the relationship between the magazine, case, cone and lens and showing the fiducial plates secured to the case.

Figure 2 is a view in top plan of the aerial camera with the magazine removed.

Figure 3 is a fragmentary vertical section through a portion of the magazine and case showing the fiducial plates carried by the magazine.

Referring more particularly to the drawings:

The camera is shown as comprising a magazine 1 in which are located the usual film storage spool 2 and film winding spool 3 for advancing the film 4 about the positioning rollers 5 and 6. The photographic exposure area is generally indicated at 7 and a means 8 represents diagrammatically a means of holding the film flat in the focal plane during the exposure operation. This means of holding the film flat may be in the form of a pressure plate or of a vacuum device and either means may correspond to that type in conventional use. The camera case 9 is shown devoid of working parts for the purpose of more clearly illustrating the manner in which the magazine is secured thereto and also the manner in which the cone 10 is secured to the case. As is customary, the lens case 11 is carried by the cone and the case 11 in turn carries a lens 12.

In the illustration shown in Figures 1 and 2 fiducial plates 13, having reference slots 13', are aligned with the camera case by doweling and by the use of attachment screws 14. Four of the fiducial plates are shown equally and radially spaced with respect to the center of the exposure area and projecting into the exposure area. The fiducial plates are shown disposed at right angles to each other. The important point is that they be radially disposed so that the lines projected therefrom inwardly will intersect at the true center of the exposure opening or the area bounded by the fiducial plates. Prior to or after the arrangement of the doweling and fastening of the fiducial plates, the camera case and the cone are placed in a jig while drilling holes in the camera case and in the cone for the joint reception of common dowel pins 15 in order to accurately align and maintain the correct alignment between the cone and the case transversely. Similar doweling operation and the use of retractable dowel pins 61 aligns and maintains correct alignment between the cone and case vertically. Then, by the use of a suitable collimator, the optical axis of the lens may be made to coincide with the exact center of the area bounded by the fiducial plates. This collimation of the lens may correspond to that practice which has become conventional in the art. As soon as the lens is in such position that the optical axis thereof is accurately located with respect to the area bounded by the fiducial plates, the lens is then fixed in this position by drilling holes in the adjacent surfaces 16 and 17 of the lens case and the cone, respectively, for the reception of a plurality of aligning dowel pins 18. This also predeterminedly positions the lens with respect to the dowel pins 15. The camera is of the between-the-lens shutter type, the shutter not being shown for purposes of clarity. As long as the fiducial plates are carried by the case it is not necessary to accurately position the magazine on the case because of the fact that the plates are in the case and will be photographed during the exposure and the point of intersection of the optical axis with the negative is determinable from them. A slight misalignment of the magazine, therefore, with respect to the case, will have no effect upon the accurate location of the optical axis on the resulting negative or print.

If, however, it becomes desirable to locate the fiducial plates in the magazine, it follows that the magazine would then necessarily have to be accurately positioned with respect to the case and the cone, keeping the center of the area bounded by the plates properly positioned with respect to the dowel pin of the case and cone. Such an arrangement is shown in Figure 3 in which the fiducial plates are doweled to and secured to the magazine base 19 by screws 60. The magazine base 19 and the upper end 20 of the the case 9 are doweled for the reception of vertically extending dowel pins 21 for maintaining this predetermined and proper aligned relationship between the magazine and the case transversely. A similar doweling operation and the use of transversely extending retractable dowel pins 64 maintains the proper aligned relationship between the magazine and the case vertically.

The lens assembly may be suitably secured to the lens case in non-adjustable relationship by means of a plurality of bolts 22. As shown in Figure 2, the case portion 23 is provided with a slot 24 of substantially greater width than that of the fiducial plate 13, leaving room for relative sliding movement of the fiducial plate therein for adjustment before it is doweled to the case and fixed thereto by means of the screws 14. This is for the purpose of permitting accurate positioning of the four fiducial plates with relation to the center of the area bounded by the plates.

It is, of course, necessary to provide additional means for securing the magazine to the case irrespective of whether the magazine is doweled to the case or not. Such means may comprise a suitable ring 25' carried by the magazine and secured by screw bolts 25 to the case. The same is true with respect to the alignment and the securing of the case to the cone. In the latter instance, the cone may be provided with suitable fastening means in the form of screw bolts 26 at spaced positions for releasably securing the case to the cone. For the purpose of providing easy access for these doweling operations the cone may be cut away at 28 as shown in Figures 1 and 2. That portion represented as a boss at 29 of the cone is then not only adapted to receive the dowel pins 15 but screw bolts 26 as well for aligning and securing the same with the case. Obviously the holes in the case for receiving the screw bolts 26 are not drilled until after the holes for the reception of the dowel pins are formed and the dowel pins have been located therein for insuring the proper alignment in accordance with the foregoing description. Subsequent also to the doweling operation for maintaining the proper relationship between the lens case and the cone, there are drilled suitable holes in the lens case and cone to receive screw bolts 30 for securing the lens case and cone in proper relationship aligned by the dowel pins. It will be noted that the outside diameter of the lens case 11 is appreciably less than the inside diameter of the collar 32 for receiving the lens case. The space 33 therebetween allows for lateral movement of the lens case on the cone during the collimating operation prior to the drilling of the holes and the positioning of the dowel pins 18. This lateral movement of the lens case on the cone is further restricted by the space 34 between the extension 35 of the lens case and the adjacent shoulder 36 of the cone. Whichever of the two spaces 34 or 33 is lesser will limit the lateral movement possible of the lens case on the cone.

While I have described, in connection with Figures 1 and 2, a series of fiducial plates carried by the case and have suggested that in such an arrangement it is not necessary that the magazine be accurately aligned with respect to the case, it nevertheless, follows that when the magazine is placed on the case there should be maintained a light-tight relationship so as to prevent faulty photographic exposure. More specifically, this light-tight relationship is accomplished by the angular light trap between the adjacent base 19 of the magazine and the upper end 20 of the case upon which the magazine rests. The leakage of light is also avoided by the snug engagement of the flange 50 of the magazine base by a flange 52 formed at the lower end of the magazine cover 51. In the event that the fiducial plates are carried by the magazine as indicated in Figure 3 it may be found possible to so accurately align the magazine with respect to the case that the doweling operation and the dowel pins may be dispensed with. This will probably be found to be a more difficult operation than the doweling operation already described. In the event, however, that such an alignment without dowel pins is found to be effective the relationship between the magazine and the case will not only be a light-tight relationship but an aligned one as well. The abutting portions of the magazine base 19 and the upper end 20 of the case form an angular light trap.

The same thing holds true insofar as the aligned relationship between the case and the cone is concerned. In other words, the adjacent shoulders of the portion 37 of the cone and the shoulders 38 and 39 of the case should be in light-tight relationship and these shoulders provide an angular light trap to prevent leakage of light.

In the event that the doweling operation and the provision of the dowel pins is carried out in accordance with the foregoing description in this respect this relationship, while being light-tight, should provide sufficient leeway for a slight relative movement between the case and the cone to permit accurate alignment and the subsequent doweling operation. In the event, however, that I may desire to dispense with the doweling operation, I may find it possible and expedient to otherwise align the case with the cone and provide the adjacent portions of the case and the cone in such a manner that they will maintain not only a light-tight relationship between the case and the cone but also provide and maintain an equal relationship between the case and the cone so that it will only be necessary to secure the two together by means of bolts such as shown at 26 and 27.

The above description is merely exemplary of different means for aligning and maintaining an accurate relationship between the film and the lens regardless of the size or shape of the cone or magazine secured to the case. The important and novel feature of the invention resides in so correlating a series of cones so that the means for aligning and connecting the cone to the case will bear a predetermined and unalterable relationship with the optical axis of the lens, or in other words, to the center of the area bounded by the fiducial plates in case the latter are used. In this connection it is to be understood that the fiducial mark may be registered on the film in other ways than by the use of the fiducial plates. For instance, the fiducial mark may be registered on the film by reflecting an image of the fiducial plate and photographing the same.

What I claim is:

1. In combination with a camera, a plurality of interchangeable magazines, cases and lens-carrying cones, said camera having an exposure opening, means for producing fiducial marks on the photographically sensitized surface, employed by said camera, during the exposure operation, said means being in predetermined non-adjustable aligned relationship in each of said cases, a lens carried by each of said cones in predetermined, non-adjustable aligned position with respect to said means for producing said fiducial marks when each of said cones is assembled in said camera, each of said cases and cones, when assembled in said camera, being in predetermined, non-adjustable aligned position with respect to each other and to said means for producing said fiducial marks, and predeterminedly adjusted means for causing each of said plurality of interchangeable cases and cones carrying said lens to automatically assume and maintain said predetermined relationship when assembled in said camera.

2. In combination with a camera, a plurality of interchangeable magazines, cases and lens-carrying cones, said camera having an exposure opening, means for producing fiducial marks on the photographically sensitized surface, employed by said camera, during the exposure operation, said means being in predetermined, non-adjustable aligned relationship in each of said magazines, a lens carried by each of said cones in predetermined, non-adjustable aligned position with respect to said means for producing said fiducial marks when each of said cones is assembled in said camera, each of said magazines, cases and cones, when assembled in said camera, being in predetermined, non-adjustable aligned position with respect to each other and to said means for producing said fiducial marks, and predeterminedly adjusted means for causing each of said plurality of interchangeable cases, magazines and cones carrying said lenses to automatically assume and maintain said predetermined relationship when assembled in said camera.

3. In combination with a camera, a plurality of interchangeable magazines, cases and cones, said camera having an exposure opening, means for producing fiducial marks on the photographically sensitized surface employed by said camera during the exposure operation, said means being predeterminedly aligned and positioned within said camera, predeterminedly adjusted means for causing each of said interchangeable magazines, cases and cones to automatically assume a predetermined aligned relationship to each other and to the means for producing said fiducial marks, lenses carried by each of said cones in predeterminedly adjusted relationship to said last named means.

4. In a camera, a magazine, a case, a cone, a lens and lens case carried by said cone, said camera having an exposure opening, means for producing fiducial marks on the photographically sensitized surface employed by said camera during the exposure operation, said means being equally and radially spaced with respect to the center of said exposure opening, predeterminedly adjusted means for causing said case, cone and lens to automatically assume a predetermined aligned relationship to said center of said exposure opening when in assembled position.

5. In an aerial photographic apparatus, a camera employing a photographically sensitized surface, means for producing fiducial marks on said surface, a magazine and a lens cone removably mounted on a case, predeterminedly adjusted means for causing said magazine and cone to automatically assume a predetermined aligned relationship when in assembled position, and a lens non-adjustably secured in said lens cone in predetermined relationship to said means for producing said fiducial marks and with respect to said marks when produced.

6. In combination with a film camera, a plurality of magazines, cases and cones, a lens and lens case carried by each of said cones, means for producing fiducial marks on the film during the exposure operation, each of said magazines, cases and cones of said camera being adapted to be removably secured to each other in predetermined aligned relationship to each other and to said means for producing said fiducial marks, said lens being secured in each of said cones in predetermined aligned relationship to said means for producing said fiducial marks, predeterminedly adjusted means for causing each of said magazines, cases and cones to automatically assume said relationship when in assembled position.

7. In combination with a film camera, a plurality of interchangeable magazines, cases and cones, a lens and lens case carried by each of said cones, means for producing fiducial marks on the film during the exposure operation, said magazine, case and cone of said camera being removably secured to each other in predetermined aligned relationship to each other and to said means for producing said fiducial marks, preadjusted means for causing each of said magazines, cases and cones to automatically assume said relationship when in assembled position, said lenses being secured in said cones in predetermined aligned relationship to said last named means.

8. In combination with a film camera, a plurality of interchangeable magazines, cases and cones, a lens and lens case carried by each of said cones, means for producing fiducial marks on the film during the exposure operation, said magazine, case and cone of said camera being removably secured to each other in predetermined aligned relationship longitudinally and transversely to each other and to said means for producing said fiducial marks, said lenses being secured in said cones in predetermined aligned relationship to said means for producing said fiducial marks, predeterminedly adjusted means for causing each of said magazines, cases and cones to automatically assume said relationship when in assembled position.

9. In combination with a film camera, a plurality of interchangeable magazines, cases and cones, a lens and lens case carried by each of said cones, said camera having an exposure opening, means for producing fiducial marks on the film during the exposure operation, said means being predeterminedly positioned within said camera with respect to the center of said exposure opening, said lenses carried by said cones being in predetermined, non-adjustable relationship to the center of said exposure opening, means comprising predeterminedly located positioning surfaces for causing each of said magazines, cases and cones to be removable and to automatically assume a predetermined relationship longitudinally and transversely to the center of said exposure opening when in assembled position.

10. In a camera, a magazine, a case, a cone, a lens and lens case carried by said cone, said camera having an exposure opening, means for producing fiducial marks on the photographically sensitized surface employed by said camera during the exposure operation, said means being equally and radially spaced with respect to the center of said exposure opening, predeterminedly adjusted means for causing said case, magazine, cone and lens to automatically assume a predetermined aligned relationship to the center of said exposure opening when in assembled position.

11. In combination with a film camera, a plurality of interchangeable magazines, cases and cones, a lens and a lens case carried by each of said cones, means for producing fiducial marks on the film during the exposure operation, each of said magazines, cases and cones being adapted to be removably secured to each other in predetermined aligned relationship longitudinally and transversely to each other and to said means for producing said fiducial marks, predeterminedly adjusted means for causing each of said magazines, cases and cones to automatically assume said relationship when in assembled position in said camera, said lenses being secured in said cones in predetermined aligned relationship to said last named means.

12. In combination with a film camera, a plurality of magazines, cases and cones, a lens and lens case carried by each of said cones, means for producing fiducial marks on the film during the exposure operation, each of said magazines, cases and cones of said camera being adapted to be removably secured to each other in predetermined aligned relationship to each other and to said means for producing said fiducial marks, predeterminedly adjusted means for causing each of said magazines, cases and cones to automatically assume said relationship when in assembled position, said lens being secured in each of said cones in predetermined aligned relationship to said last named means.

13. In combination with a film camera, a plurality of interchangeable magazines, cases and cones, a lens and case carried by each of said cones, means for producing fiducial marks on the film during the exposure operation, said lenses being secured in said cones in predtermined aligned relationship to said means for producing said fiducial marks, each of said magazines, cases and cones being adapted to be removably secured to each other in predetermined aligned relationship longitudinally and transversely to each other, predeterminedly adjusted means for causing each of said magazines, cases and cones to automatically assume said relationship when in assembled position in said camera.

FREDERICK W. LUTZ.